(12) United States Patent
Melero et al.

(10) Patent No.: US 7,457,706 B2
(45) Date of Patent: Nov. 25, 2008

(54) 3-DIMENSIONAL INTERACTIVE IMAGE MODELING SYSTEM

(75) Inventors: Kenneth Melero, Centreville, VA (US);
Douglas W. Shibla, Ashburn, VA (US);
Mark R. Lucas, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 574 days.

(21) Appl. No.: 10/281,898

(22) Filed: Oct. 25, 2002

(65) Prior Publication Data

US 2003/0088362 A1    May 8, 2003

Related U.S. Application Data

(63) Continuation-in-part of application No. 09/640,135, filed on Aug. 16, 2000, now Pat. No. 6,484,101.

(51) Int. Cl.
*G01V 3/38* (2006.01)
*G06K 9/03* (2006.01)

(52) U.S. Cl. .......................................... 702/5; 382/311

(58) Field of Classification Search ...................... 702/5, 702/2, 16, 1; 382/311, 278, 305
See application file for complete search history.

(56) References Cited

U.S. PATENT DOCUMENTS

| | | | |
|---|---|---|---|
| 6,181,836 B1 * | 1/2001 | Delean | 382/302 |
| 6,421,610 B1 * | 7/2002 | Carroll et al. | 702/5 |
| 6,604,046 B1 * | 8/2003 | Van Watermulen et al. | 701/208 |
| 6,687,416 B2 * | 2/2004 | Wang | 382/278 |
| 6,704,654 B2 * | 3/2004 | Carroll et al. | 702/5 |
| 6,708,117 B2 * | 3/2004 | Carroll et al. | 702/5 |

OTHER PUBLICATIONS

McCurley, Geospatial Mapping and Navigation of the Web, May 1-5, 2001, WWW 10.*
Jung, MetaViz: Visual Interaction with Geospatial Digital Libraries, Oct. 1999, International Computer Science Institute, Technical Report TR-99-017.*
Faust et al., Real-Time Global Data Model for the Digital Earth, 2000, Proceedings of the International Conference on Discrete Global Grids.*
Potmesil, Maps Alive: Viewing Geospatial Information on the WWW, 1997, Computer Networks and ISDN Systems 29, pp. 1327-1342.*

* cited by examiner

*Primary Examiner*—Michael P. Nghiem
*Assistant Examiner*—Toan M Le
(74) *Attorney, Agent, or Firm*—Hamilton Brook Smith Reynolds, P.C.

(57) ABSTRACT

A system and method for generating custom geospatial information maps and precision corrected images allows real-time interactive production of a desired output image by incorporating user selectable parameters that define various image synthesizing operations. A graphical user interface allows a user to specify parameters that define the desired output image via a remote computing device over a public access network such as the Internet. The parameters define image synthesizing operations such as area, projection, datum, fusion, masking, blending, mosaiking, resampling, and others. The desired output image is processed by an image assembly server according to the parameters and a variety of geospatial image data sources, and electronically delivered to a user via a public access network. The geospatial information may also be correlated with non-georeferenced data such that relevant associations between non-georeferenced data and the geospatial data are integrated in the output information product.

24 Claims, 6 Drawing Sheets

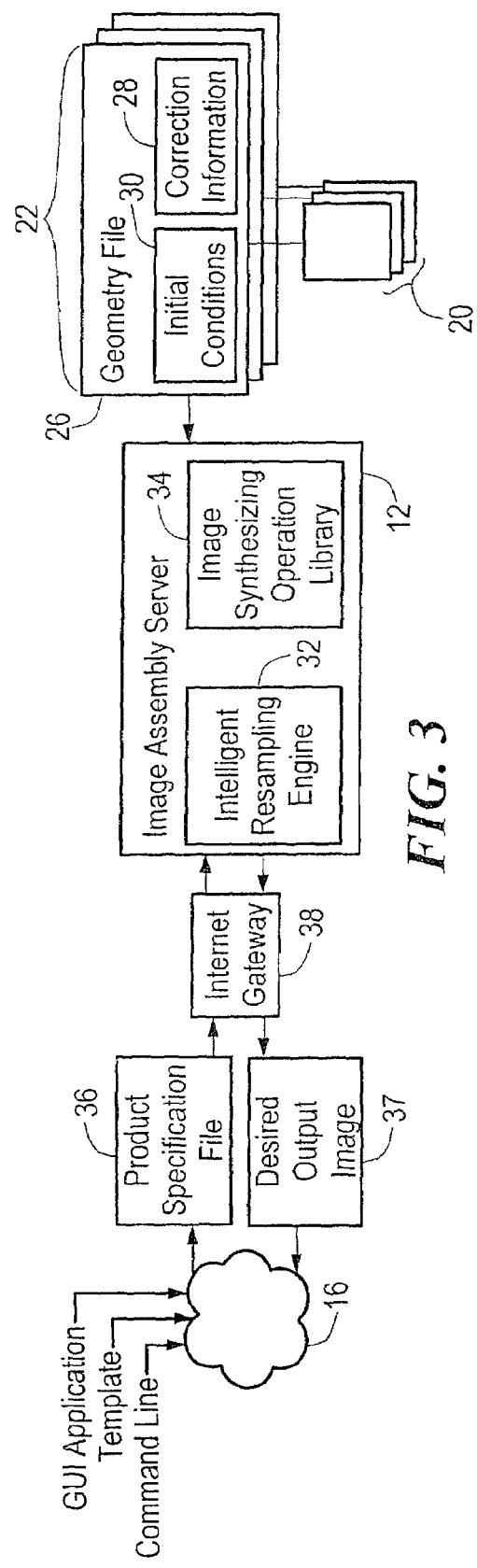
FIG. 3
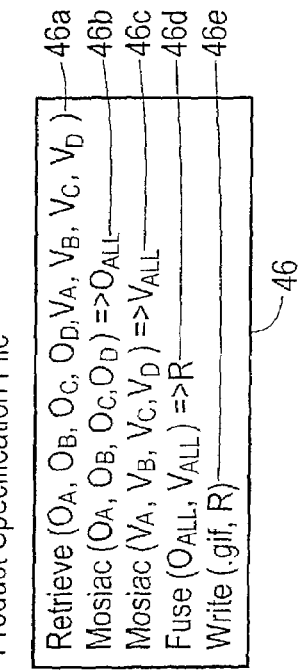
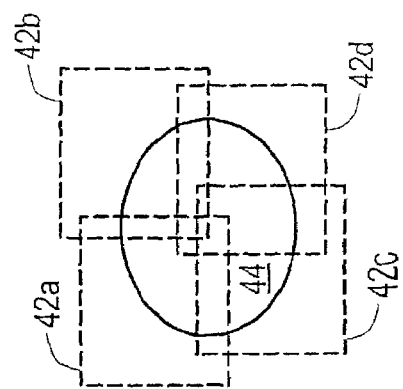
FIG. 5A
Product Specification File
Retrieve ($O_A$, $O_B$, $O_C$, $O_D$, $V_A$, $V_B$, $V_C$, $V_D$) — 46a
Mosiac ($O_A$, $O_B$, $O_C$, $O_D$) => $O_{ALL}$ — 46b
Mosiac ($V_A$, $V_B$, $V_C$, $V_D$) => $V_{ALL}$ — 46c
Fuse ($O_{ALL}$, $V_{ALL}$) => R — 46d
Write (.gif, R) — 46e
FIG. 5B

3-DIMENSIONAL INTERACTIVE IMAGE MODELING SYSTEM

RELATED APPLICATIONS

This application is a continuation-in-part of U.S. application Ser. No. 09/640,135, filed Aug. 16, 2000, now U.S. Pat. No. 6,484,101. The entire teachings of the above application(s) are incorporated herein by reference.

BACKGROUND OF THE INVENTION

Geospatial image data is often used to generate a map of a geographical area to denote a variety of geographic features. Such geospatial image data is gathered by a variety of techniques, such as via satellites and aircraft, and encompasses data gathered by a variety of sensor mediums, such as optical, radar, infrared, laser, and others. Often, the geospatial image data must be processed through mathematical synthesizing operations to obtain a desired output image. The synthesizing operations typically require significant manual efforts, and require substantial time and computational resources to compute. Accordingly, the desired output images may only be gathered periodically, must anticipate a substantial time delay, and require manual intervention in order to modify or apply a new synthesizing operation to the geospatial data to obtain the desired output image.

Raw geospatial data has been and continues to be gathered by a variety of governmental and private entities. The National Image and Mapping Agency (NIMA), The National Reconnaissance Office (NRO), and the Federal Geographic Data Committee (FGDC) are among the various entities that catalog raw geospatial data. The raw geospatial data is typically used in Geographic Information Systems (GIS) according to protocols such as the National Spatial Data Infrastructure (NSDI), promulgated by the FGDC, and embodied in the National Geospatial Data Clearinghouse, a public domain collection of geospatial data organized to promote cooperative production and sharing of geospatial data among federal, state, academic, corporate, and private entities having an interest in geospatial data. While initially developed to support intelligence operations for military purposes, geospatial data is now being used for a variety of research and consumer purposes, including oil and gas mining, agricultural conditions, outdoor expeditions such as camping, hunting and fishing, and recreation such as golf and flight simulation.

Traditionally, geospatial images produced from raw geospatial data have been produced through time intensive manual computations. The raw geospatial data is gathered from various sensors focused on a particular geographic area. These computations typically gather the raw geospatial data from a variety of geographic areas, and synthesize the desired output image. The synthesizing operations typically include polynomial warping techniques to distort one image to match one of an adjacent geographic area, and resampling techniques to project, filter, combine, fuse, and mask the images represented by the raw geospatial data. Other synthesizing operations are known to those skilled in the art. Since the synthesizing operations are performed by a time intensive manual sequence, the results typically represent a static archive because the resultant output images are used in static form with infrequent modification.

For example, a desired output image might represent a fusion of an optical satellite image with an infrared aircraft scanning of a land mass having fossil fuel reserves to facilitate mining or oil production. Similarly, an agricultural application might involve a combining of a high resolution monochrome image with a lower resolution color image to ascertain or predict vegetation patterns. A PC application might employ images of a variety of golf courses to provide a realistic simulation. Many other uses and applications can be contemplated.

As illustrated above, generation of geospatial images corresponding to a desired output image can be time and computationally intensive. Manual manipulation of the various parameters that define each instantiation of the desired output image is required. It would be beneficial, therefore, to provide a system and method for allowing user selectable parameters to specify the image synthesizing operations which define a desired output image, to allow interactive realtime generation of the desired output image from a remote computing device based upon the user selectable parameters, and to provide delivery of the desired output image to the user via an electronic medium such as the Internet.

SUMMARY OF THE INVENTION

A system and method for generating custom geospatial information maps and precision corrected images allows real-time interactive production of a desired output image by incorporating user selectable parameters that define various image synthesizing operations. A graphical user interface allows a user to specify parameters that define the desired output image via a remote computing device over a public access network such as the Internet. The parameters define image synthesizing operations such as area, projection, datum, fusion, masking, blending, mosaicking, resampling, and others. The desired output image is processed by an image assembly server according to the parameters and a variety of geospatial image data sources, and electronically delivered to a user via a public access network. A user may therefore receive a desired output image that conforms to a variety of user-specified parameters interactively via an image assembly server, and interactively update and refine the desired output image via the graphical user interface, thereby providing an active archive of a set of images that can be revised dynamically.

The geospatial information may also be correlated with non-georeferenced data such that relevant associations between non-georeferenced data and the geospatial data are integrated in the output information product. Non-georeferenced data is data that bears little or no relation to a geographic location, such as an article or graphic. By associating non-georeferenced data to a geographic location, the system and methodology described above is extended and expanded to include these associations such that the non-georeferenced, or digital data, can be drawn upon in conjunction with the geospatial data to which it corresponds.

Traditionally, all forms of digital data inherently have either some readily identifiable (discrete) or less apparent (subdued) relation to a geographic location on the earth. Discrete relations can be specifically tagged on the digital data, be an associated file along with the digital data, or embedded in the digital data. Subdued relations may be, for example, be the location of the creation of the digital data, the digital data's topic's location, or the digital data's physical location. Nonetheless, digital data can be associated to a geographic location, in a graphical manner, by connecting these geographic points, similar to "connect the dots." Once the non-georeferenced data has been associated with a location or a collection of locations, the data can then be merged with other custom geospatial information maps and precision corrected images to allow real-time interactive production of a desired output information product.

A graphical user interface facilitates identification of data associations to relate a geographic location or list of locations to the digital data. The data associations are made by using other known support data to relate the digital data with the geographic location. The desired output information product is assembled according to the user's defined parameters by an image assembly server and electronically delivered to a user via a public access network.

The non-georeferenced data is correlated to the geospatial data by providing at least one geospatial data file having a geospatial image and indicative of a geographic location and identifying at least one geographic reference in the geospatial image. At least one non-georeference data file is provided, and a non-georeferenced digital data item identified in the non-georeference data file. An association is then defined between the geographic reference and the non-georeferenced digital data item. The non-georeferenced digital data item is correlated with the geographic reference to generate an output information product indicative of the association between the geospatial data and the non-georeferenced digital data item.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 shows the image assembly server;

FIG. 5a shows an example of images used to generate a desired output image;

FIG. 5b shows the product specification file referencing the images of FIG. 5a to generate a desired output image;

DETAILED DESCRIPTION OF THE INVENTION

A description of preferred embodiments of the invention follows.

Figure 1:
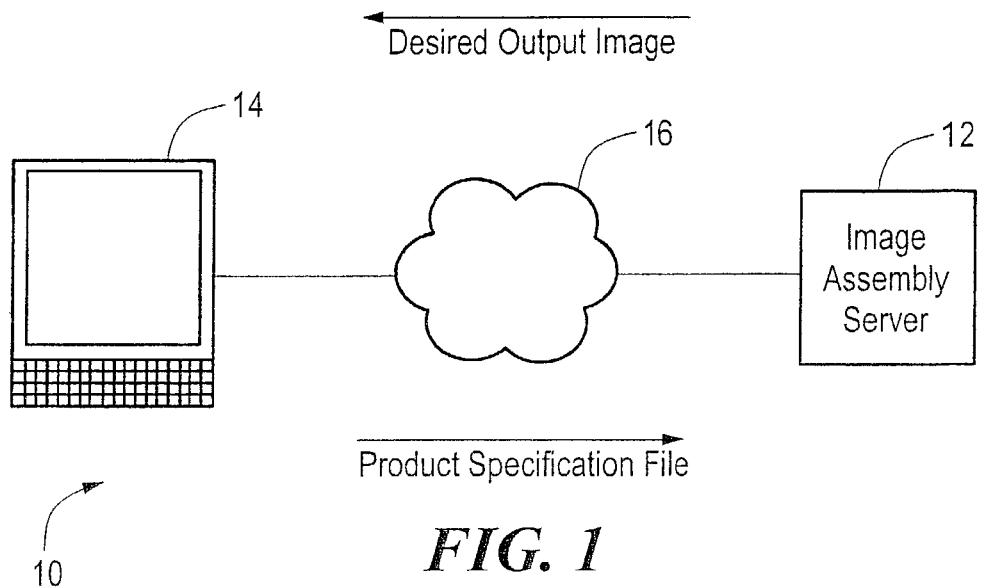
FIG. 1 shows a block context diagram of the interactive image modeling system described herein.

FIG. 1 shows a block context diagram of the interactive image modeling system 10 as described herein. An image assembly server 12 is in communication with a user computing device 14 such as a PC via a public access network 16. The user computing device 14 is operable to send requests for a desired output image to the image assembly server 12. The image assembly server is responsive to the requests for a desired output image, and sends the desired output image to the user computing device 14 via the public access network 16.

Figure 2:
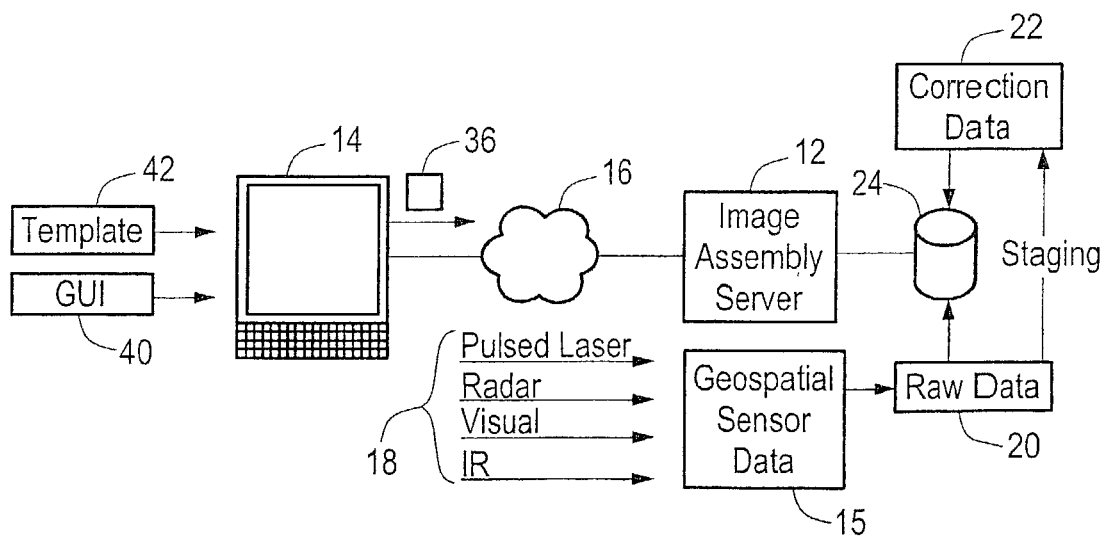
FIG. 2 shows the system of FIG. 1 in greater detail.

FIG. 2 shows the system depicted in FIG. 1 in greater detail. Referring to FIG. 2, geospatial sensor data 15 is gathered from a variety of sensor data mediums 18, such as optical or visual, infrared (IR), radar, and pulsed laser, and may be indicative of data sets such as vegetative indexes, flood plane classifications, population density maps, and spectral imagery. Gathering the geospatial sensor data 15 produces raw geospatial data 20. The raw geospatial data is manipulated in a process known as staging to produce correction data 22, known as metadata, corresponding to inaccuracies in the raw geospatial data. The correction data 22 is stored as a plurality of geometry files in a geospatial data base 24 along with the corresponding raw geospatial data 20 to populate the geospatial database 24 with geospatial data.

The desired output image is defined by a product specification file. A user generates a product specification file 36 via a variety of methods, described further below. In a particular embodiment, the user computing device 14 executes a product definition application via a graphical user interface (GUI) 40 to access a template 42. The template is indicative of parameters, including features and operations, which define the desired output image. The parameters may be predetermined or user defined, depending on the template. Using the graphical user interface 40 and the template 42, the user computing device is employed to define the user defined parameters. The user computing device builds the product specification file 36 from the user defined parameters and the predetermined parameters. The completed product specification file 36 is then sent to the image assembly server 12 via the Internet 16.

FIG. 3 shows the image assembly server in greater detail. Referring to FIGS. 2 and 3, the image assembly server 12 includes an intelligent resampling engine 32 and an image synthesizing operation library 34. The product specification file 36 is sent from the user computing device 14 via an Internet gateway 38. The product specification file 36 contains keywords which correspond to image synthesizing operations in the image synthesizing operation library 34. One or more parameters define each of the image synthesizing operations to be performed. The parameters are expressed as keywords in the product specification file 36, and represent aspects and features of the desired output image 37. The intelligent resampling engine 32 scans the product specification file 36 to determine a synthesizing operation to be performed, and retrieves the corresponding image data from the geospatial database 24. The intelligent resampling engine 32 references the image synthesizing operation library 34 to find the synthesizing operation to be performed, and applies the operation to the geospatial image data retrieved from the geospatial database 24. Note that successive synthesizing operations may be applied to the same geospatial image data.

The image data stored in the geospatial database is stored in a form which allows it to be used by the intelligent resampling engine 32. The geospatial database 24 includes raw data files 20 and geometry files 26. The geometry files store the correction data 22 in two components. An initial conditions component defines corrections that address sensor-based inaccuracies in the data as originally gathered. Such corrections may, for example, include pitch and roll of an airplane, or camera angle relative to the ground. The second component is correcting information that defines corrections to the initial conditions component. This information may include, information such as orthorectification data to adjust for parallax, for example. An initial conditions component and a correcting information component is stored in the geospatial database to correspond to each raw data file 20.

Figure 4:
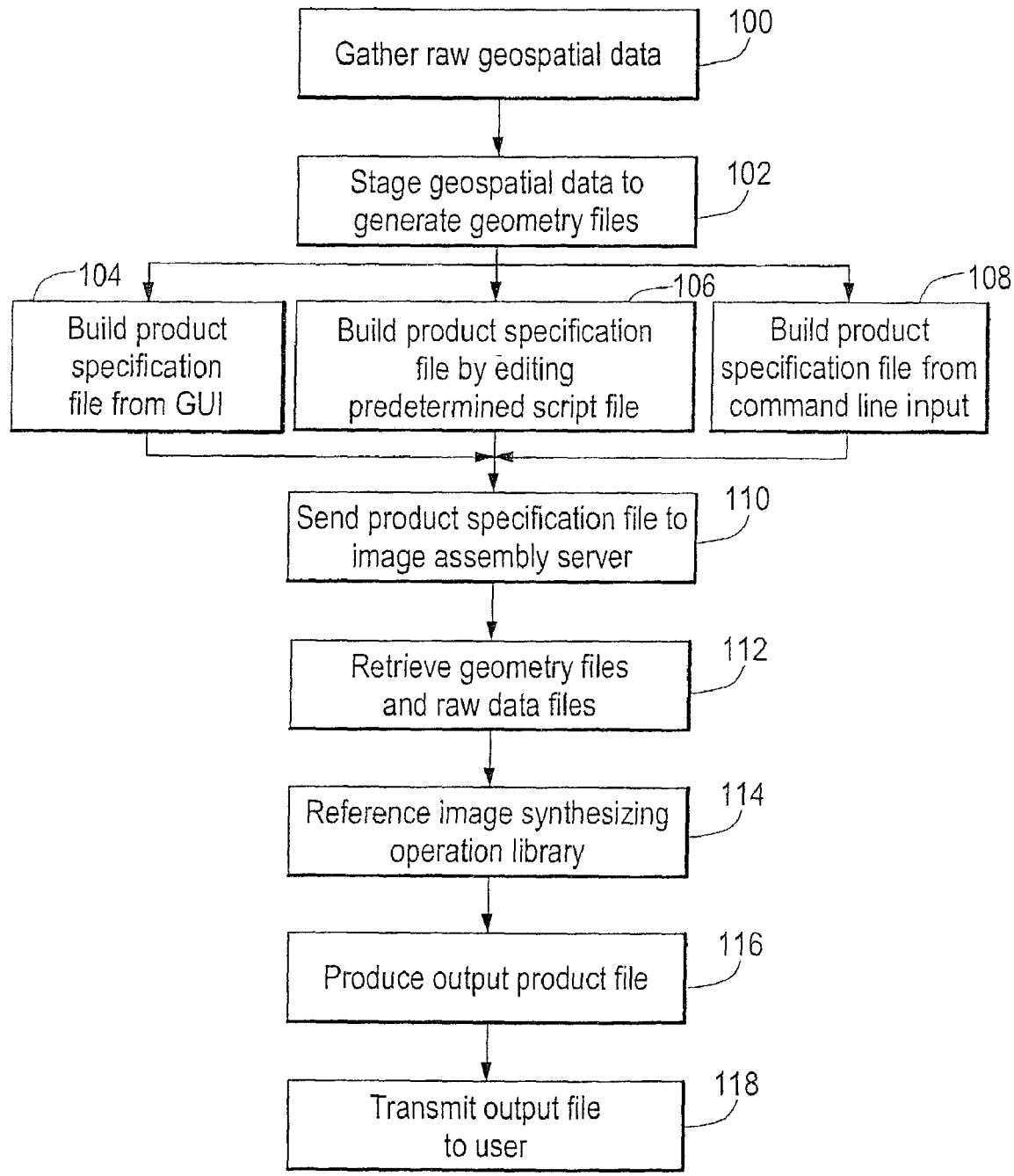
FIG. 4 shows a flowchart depicting generation of a desired output image.

A flowchart of the generation of a desired output image 37 is shown in FIG. 4. Raw geospatial data is gathered from a variety of sources, as depicted at step 100. The raw geospatial data is staged to generate a plurality of geometry files, as disclosed at step 102. The product specification file is built from one of a variety of sources, including via a GUI, as shown at step 104, by editing a predetermined script file, as shown at step 106, or generated as a sequence of command lines from direct user input, as depicted at step 108. The product specification file is sent to the image assembly server 12 via the Internet 14, and is received at the image assembly server 12 via the Internet gateway 38, as shown at step 110. The intelligent resampling engine 32 retrieves the corresponding geometry files and raw data files needed, as disclosed at step 112. The image synthesizing operation library 34 is referenced to find the corresponding synthesizing operations to apply, as depicted at step 114. The output product file containing the desired output image is produced from the synthesizing operations, as shown at step 116, and the output product file is transmitted to the user, as disclosed at step 118.

FIGS. 5a and 5b show an example product specification file and the corresponding images. This example demonstrates a desired output image depicting soil vegetative indexes as might be used in an assessing the agricultural potential of a proposed farming area region 44. Visual, or optical images of the area are fused with images depicting vegetative indexes. Geometry files and raw geospatial data files exist for areas 42a-42d from the sensor data mediums for optical information and for vegetative indexes information, as defined in table I:

TABLE I

| Image | Area | Sensor Measuring Medium |
|---|---|---|
| $O_A$ | 42A | Optical |
| $O_B$ | 42B | Optical |
| $O_C$ | 42C | Optical |
| $O_D$ | 42D | Optical |
| $V_A$ | 42A | Vegetative |
| $V_B$ | 42B | Vegetative |
| $V_C$ | 42C | Vegetative |
| $V_D$ | 42D | Vegetative |

A product specification file 46 defines the operations to produce the desired output image indicative of soil vegetative indexes for the region 44. Line 46a identifies and retrieves the geometry files and raw data files needed. Line 46b specifies a mosaicking operation to be applied to the optical images $O_A$-$O_D$ to combine the overlapping areas which cover the region 44, and produces the resultant image $O_{ALL}$. Similarly, line 46c specifies a mosaicking for the vegetative images $V_A$-$V_D$, to combine the overlapping areas 42a-42d with respect to vegetative indexes to generate the resultant image $V_{ALL}$. Line 46d specifies a fusion operation on the previous two images $O_{ALL}$ and $V_{ALL}$ to produce a resultant image R corresponding to the desired output image. Line 46e specifies that the image R be written to an output product file in .gif format, where it may be transmitted to the user computing device as described above.

The product specification file which defines the desired output image may be provided from a variety of sources. In the particular embodiment described above, a product definition application invokes a GUI and a template to provide predetermined parameters, to which user defined parameters are added. A typical GUI might incorporate point-and-click button bars corresponding to the user defined parameters, for example. The GUI which produces the product specification file can provide a range of predetermined parameters and user defined parameters, depending on the level of control and complexity desired by the user. Point-and-click button bars might be provided to correspond to each of the user defined parameters, while the predetermined parameters are constant and do not require user intervention. At a more sophisticated end of the range, a user might be a scientist, researching fossil fuels in a region, who requires much control over the parameters of the desired output image, and is not hindered by the complexity of the interface. At a less sophisticated end of the range might be a real estate agent who merely requires a visual detail delineating property lines, and who does not need to apply a complex series of synthesizing operations to achieve a desired output image.

As indicated above, the parameters defined in the product specification file, both user defined and predetermined, indicate the synthesizing operations which define the desired output image. These features and operations are expressed as a sequence of keywords in the product specification file. In the particular embodiments described above, the keywords are written by the GUI, with levels of user input varying depending on the sophistication of the user. In yet another embodiment of the invention, the product specification file can be manually edited as a text file. The text file could be written with a template provided as a starting point, from which the user may freely modify. Further, a user may wish to build their own product specification file, thereby retaining as much control as possible over the desired output image.

The interactive nature of the product specification file and the resultant generation of the desired output image, therefore, allows a user to generate a series of desired output images, each possibly differing only by a single feature or aspect. In this manner, a user may approach a geospatial research task in a "what if" manner, allowing the effect of different parameters to be seen individually. In another context, a constant product specification file could be provided to a plurality of users to allow each to recreate the desired output image on their local computing device. A business method providing such desired output images could effect a pricing scale that is driven in part by the number of users expected. When a large number of users are expected for a relatively narrow, or constant, range of desired output images, each could be charged less because the total revenue derived from the group would offset the resource cost associated with generating the desired output image. Similarly, a dedicated user requiring a range of allowed parameters, could be provided a complex GUI at a higher price because that user would be expected to consume more resources in generating the desired output images.

Further, the system and methods described herein are applicable to a wide variety of uses of the geospatial data and resulting desired output images. While prior art usage of geospatial data has typically been reserved to well-funded applications such as military and scientific research, the system and method defined herein makes the usage of geospatial data applicable to recreational contexts as well. Desired output images corresponding to the topography of an area can be used in flight simulator PC applications. A PC golf application might use a variety of visual geospatial data to provide a user with a variety of local and distant golf courses. Indeed, a marketing strategy consistent with the expected number of users as described above can make such recreational usage feasible.

One extension to the processing and creation of the desired output image is integration of non-georeferenced data with the geospatial data as a common information output. Non-georeferenced data is defined as digital data that has not been tagged or associated to a geographic location on the earth. Geospatial data is defined as digital data that has some place on the earth. It has been tagged or can be associated to a geographic location. Sources of non-georeferenced data are many and can include any form of digital data. Some may be documents, reports, presentations, proposals, video clips, audio clips, spreadsheets, photographs, digital pictures, or charts. Particular types may include but are not limited to text files, ASCII files, document files, URLs, http files, .tif files, .jpeg files, .mpeg file, .mp3 files, .pdf files, executable files, streaming audio, streaming video, digital images, and graphic files, as described above. Geospatial digital data is generally in the form of imagery acquired by some airborne platform, such as an airplane or satellite. Geospatial digital data is inheritably associated to the earth, traditionally by an embedded tag describing the geographic location.

Generation of data associations can be done in many fashions and using many types of information support data. In a particular embodiment a gazetteer is employed as the information support data. A gazetteer is defined as a database of defined place names related to some geographic location. Many information databases are composed by government agencies and made available in the public domain. Gazetteers that may be employed include the Census 2000 Gazetteer, National Imagery and Mapping Agency (NIMA) Geonet Names Server (GNS), and the United States Geological Survey (USGS) Geographic Names Information System (GNIS). The gazetteer location data was then used to geocode the non-georeferenced digital data.

Geocoding is defined by associating a geographic location in longitude and latitude to a place on the earth. This may be done, for example, by mapping the latitude and longitude of the gazetteer place name to the non-georeferenced data. The newly created data association is then stored in a relational database system. The described data association is generated automatically by uploading the digital data into the form shown in the relational database model in FIG. 8, described further below. Other forms of databases may also be employed to define the associations.

Figure 6:
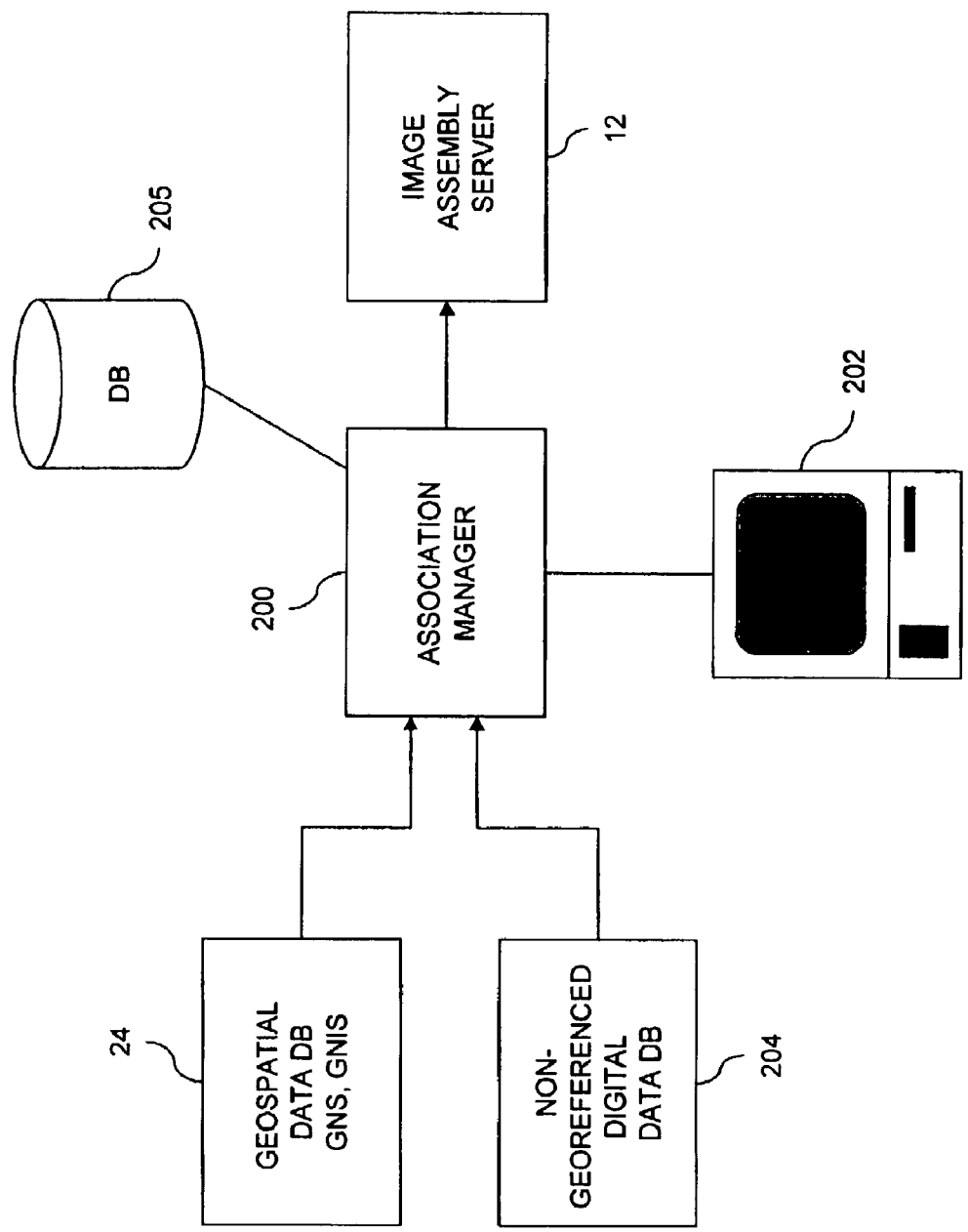
FIG. 6 shows a block diagram of an alternate embodiment associating non-georeferenced data to geospatial data.

In a particular embodiment, a graphical user interface in communication with an association manager facilitates identification of data associations to relate a geographic location or list of locations to the non-georeferenced digital data. Referring to FIG. 6, geospatial data, such as that from the NIMA GNA and the USGS GNS, exists in the geospatial database 24. The non-georeferenced data is stored in a non-georeferenced database 204. An association manager 200 is driven by a GUI 202, and is employed to define the associations between the geospatial data and the non-georeferenced data. The image assembly server 12 then produces the desired output information product including the correlated geospatial and non-georeferenced data according to the user's defined parameters by an image assembly server and electronically delivered to a user via a public access network 16 (FIG. 1).

For example, a user generates a report on the effects of pollution in the rainforest of the Amazon. By using the graphical user interface of the system a user can relate several geographic locations to the report. Querying the NIMA GNS, a user finds the place name record with a geographic location for Brazil, Colombia, and Venezuela. By uploading this report to the described database model above a user has associated the geographic locations (latitudes and longitudes) of Brazil, Colombia, and Venezuela to the report.

Figure 7:
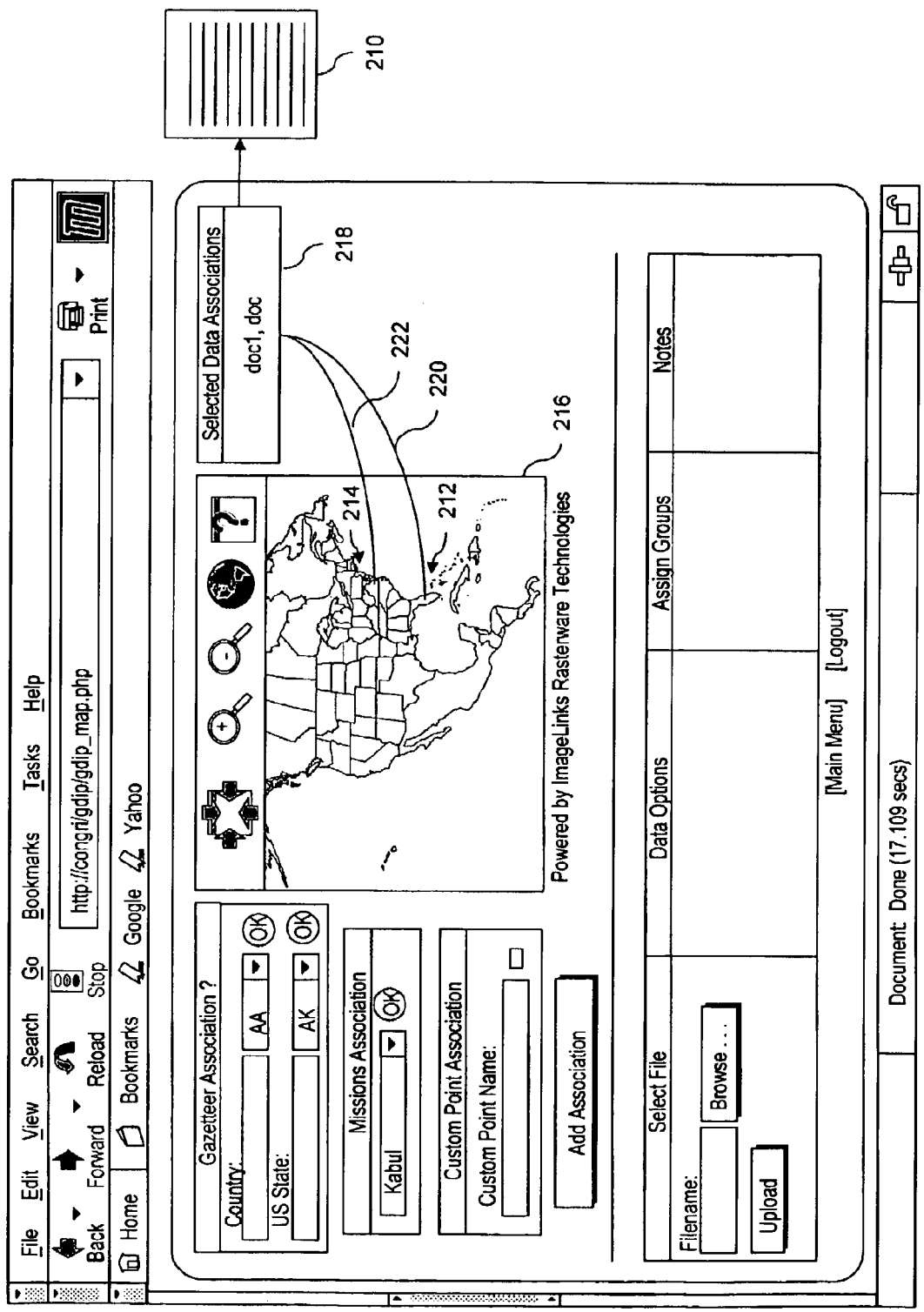
FIG. 7 shows an example of the GUI employed to define an association.

FIG. 7 shows an example of the GUI employed to define an association. Referring to FIG. 7, a paper 210 about Melbourne, Fla. 212 was authored in Chantilly, Va. 214. The paper 210, or a reference thereto, is read by the association manager 200 from the non-georeferenced database 204. The paper is represented by the GUI 202 as icon 218. A geospatial image 216 of the United States is read from the geospatial database 24. A user employs the GUI in a point and click manner to define a first relation 220 from Melbourne 212 to icon 218, and a second relation from Chantilly 214 to icon 218. An association database 205 then stores the associations. In this manner, an arbitrary non-georeferenced data item may be associated with a plurality of geospatial references.

The invention defined by the present claims provides a plurality of methods for creating an association. First, the user can use one of the supplied gazetteers to create an association and selected it. Alternatively, the user can pan and zoom on a map of the earth and specifically designate a point on the earth to name and create an association. The user slowly builds a list of data associations that will be related to the uploaded digital data in the database. The result of the described method is a database of digital data that has geospatial associations. This data can now be merged with other geospatial data, such as imagery, and integrated into the 3-dimensional interactive image modeling system to provide more information-rich output products.

Further, the non-georeferenced data may be parsed by the association manager 200 to determine geographic references, such as text strings indicative of locations. The text may then be automatically mapped, or compared to the geospatial data to determine associations.

Figure 8:
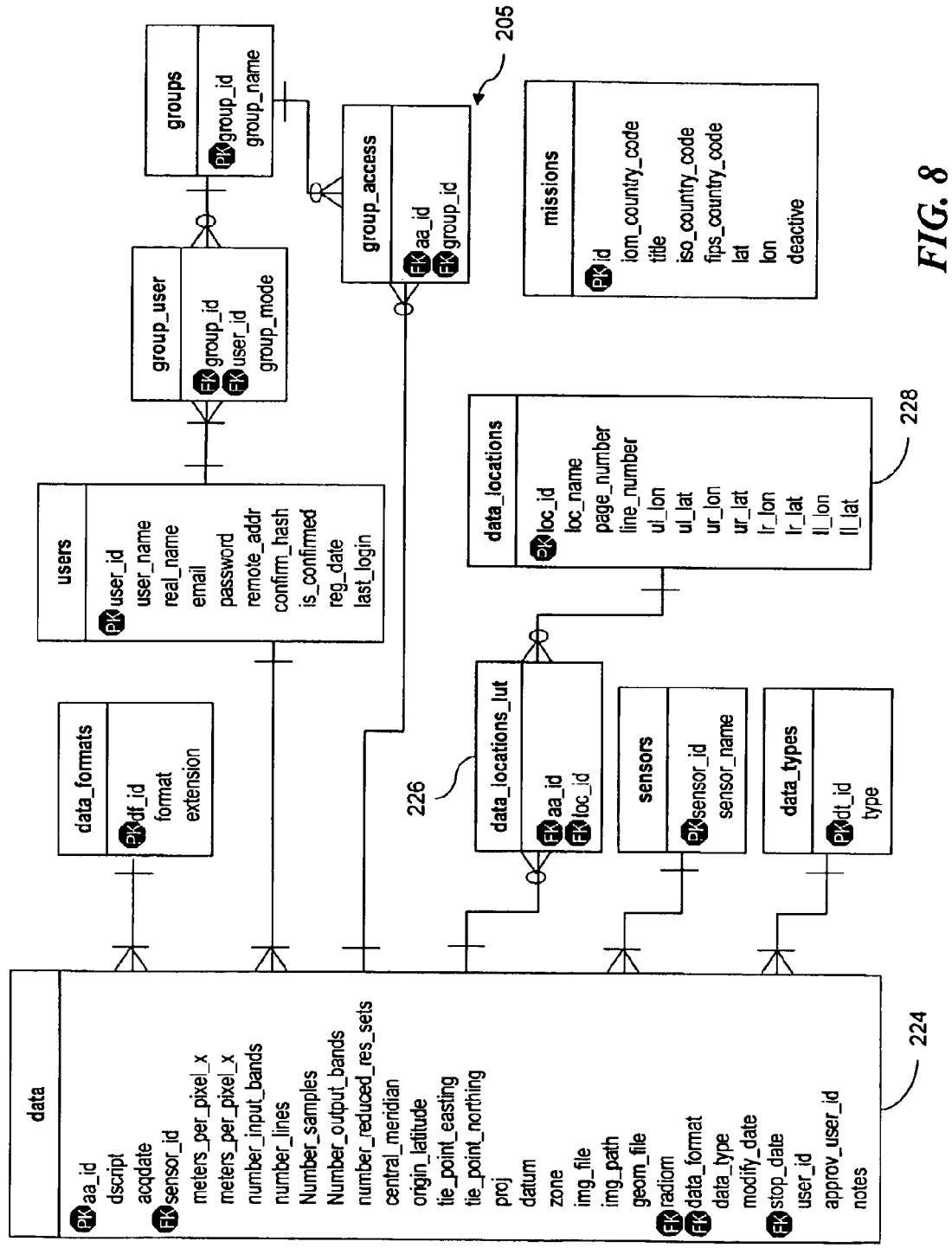
FIG. 8 shows a DB entity-relation diagram of a database for storing the non-geospatial associations.

FIG. 8 shows the association database 205 in greater detail. Referring to FIGS. 8 and 6, a data entity 224 stores references to the non-georeferenced data in the non-georeference database 204. A data_locations entity 228 stores the geospatial references into the geospatial data, such as by latitude and longitude. A data_locations_lut entity 226 stores the associations (220, 222, FIG. 7) in a many to many manner. Therefore, a plurality of non-georeferenced data items may each be associated with a plurality of geospatial data references.

The system as described above can be employed to create more efficient access to geospatial and related non-geospatial data. There is a modern trend of an increasing number of companies moving to storing digital data in large geospatially-enabled data warehouses. Accordingly, in order to store this data in the scheme illustrated in FIG. 8, the data is associated to the earth is some manner. Thus, there exist many benefits to creating geospatially-enabled data. By geographically associating digital data, users can make use of fast location-based algorithms within these data warehouses to query information easier, identify trends in information migration, or integrate with location-based web services. Attributes of the data can be viewed, queried, and researched visually through client applications or a web browser. Providing a centralized database solves management of large volumes of digital data that once was all unrelated in nature making digital data in all forms easily available.

Those skilled in the art should readily appreciate that the programs defining the operations and methods defined herein are both deliverable to an image assembly server and a user computing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components, or hardware, software or firmware simulators.

While the system and method for interactively generating geospatial image maps have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of correlating non-georeferenced data to geospatial data comprising:
   providing at least one geospatial digital data object having a geospatial image and indicative of a geographic location;
   identifying at least one geographic reference in the geospatial image;
   providing at least one non-georeference digital data object;
   identifying a non-georeferenced digital data item in the non-georeference digital data object;
   defining an association between the geographic reference and the non-georeferenced digital data item; and
   merging the non-georeferenced digital data item and the geographic reference to generate an output information product indicative of the association between the geospatial digital data object and the non-georeferenced digital data item.

2. The method of claim 1 further comprising
   repeating the identifying the geographic reference, identifying the non-georeferenced digital data item, and defining the associations to generate a plurality of associations; and
   storing the associations in an association database.

3. The method of claim 1 further comprising storing the geospatial digital data objects, the non-georeference digital data objects, and the defined associations in a database operable to be accessed by an image assembly server.

4. The method of claim 1 wherein the association is indicative of a degree of relevance the non-georeferenced digital data item bears to the geographic reference.

5. The method of claim 1 wherein the associations further comprise discrete associations and indirect associations.

6. The method of claim 1 wherein the associations further comprise automated associations and interactive associations, the automated associations computed by a data comparison operation and the interactive associations defined via a Graphical User Interface (GUI).

7. The method of claim 6 wherein identifying the automated associations further comprise parsing the non-georeference digital data object for data indicative of a geospatial reference.

8. The method of claim 6 wherein identifying the interactive associations further comprises:
   displaying at least a portion of the geospatial digital data object to a user, the portion further including the geographic reference;
   displaying at least a portion of the non-georeferenced digital data item; and
   defining, via a point-and-click graphical user interface, the association between the geographic reference and the non-georeference digital data item.

9. The method of claim 1 wherein the correlating further comprises resampling a plurality of geospatial digital data objects and the corresponding associations.

10. The method of claim 9 wherein resampling further comprises resampling with at least one product specification file.

11. The method of claim 1 wherein the non-georeferenced data further consists of data selected from the group consisting of text files, ASCII files, document files, URLs, http files, .tif files, .jpeg files, .mpeg file, .mp3 files, .pdf files, executable files, streaming audio, streaming video, digital images, and graphic files.

12. A system for generating associations between non-georeferenced data and geospatial data for geospatial information output products comprising:
   a geospatial database having geospatial data;
   at least one geospatial digital data object in the geospatial database indicative of a geographic location;
   a non-georeference database having non-georeferenced digital data;
   at least one non-georeferenced data item in the non-georeference database;
   an association manager operable to read the geospatial digital data object and the non-georeferenced data item and further operable to define an association between a geographic reference in the geospatial digital data object and the non-georeferenced data item;
   a graphical user interface (GUI) operable to receive the geospatial digital data object and the non-georeferenced data item and receive a user input defining the association, the association manager responsive to the GUI; and
   an association database in communication with the association manager and operable to store the associations.

13. The system of claim 12 wherein the association manager is further operable to repeat:
   defining the associations to generate a plurality of associations; and
   storing the associations in a database.

14. The system of claim 12 wherein the association manager is further operable to define associations indicative of a degree of relevance the non-georeferenced digital data item bears to the geographic reference.

15. The system of claim 12 wherein the association manager is further operable to define discrete associations and indirect associations.

16. The system of claim 12 wherein the association manager is further operable to compute automated associations and interactive associations, the automated associations computed by a data comparison operation and the interactive associations determined via a Graphical User Interface (GUI).

17. The system of claim 16 wherein the association manager is further operable to parse the non-georeference database for data indicative of a geospatial reference and generating automated associations therefrom.

18. The system of claim 16 wherein the association manager is further operable to identify the interactive associations defined via a point-and-click graphical user interface (GUI).

19. The system of claim 12 further comprising an image assembly server operable for communication with the association manager for generating a geospatial output information product indicative of the defined association between the geospatial digital data object and the non-georeferenced data item.

20. The system of claim 19 wherein the image assembly server is further operable to resample a plurality of geospatial digital data objects and the corresponding associations.

21. The system of claim 20 wherein the image assembly server is further operable to resample with at least one product specification file.

22. The system of claim 12 wherein the non-georeferenced data further consists of data selected from the group consisting of text files, ASCII files, document files, URLs, http files, .tif files, .jpeg files, .mpeg file, .mp3 files, .pdf files, executable files, streaming audio, streaming video, digital images, and graphic files.

23. A computer readable medium having computer program code for correlating non-georeferenced data to geospatial data comprising:
   computer program code for providing at least one geospatial digital data object having a geospatial image and indicative of a geographic location;
   computer program code for identifying at least one geographic reference in the geospatial image;
   computer program code for providing at least one non-georeference digital data object;
   computer program code for identifying a non-georeferenced digital data item in the non-georeference digital data object;
   computer program code for defining an association between the geographic reference and the non-georeferenced digital data item; and
   computer program code for merging the non-georeferenced digital data item and the geographic reference to generate an output information product indicative of the association between the geospatial digital data object and the non-georeferenced digital data item.

24. A system for generating associations between non-georeferenced data and geospatial data for geospatial information output products comprising:
   means for providing at least one geospatial digital data object having a geospatial image and indicative of a geographic location;
   means for identifying at least one geographic reference in the geospatial image;
   means for providing at least one non-georeference digital data object;
   means for identifying a non-georeferenced digital data item in the non-georeference digital data object;
   means for defining an association between the geographic reference and the non-georeferenced digital data item; and
   means for correlating the non-georeferenced digital data item and the geographic reference to generate an output information product indicative of the association between the geospatial digital data object and the non-georeferenced digital data item.

* * * * *